US006999644B1

(12) United States Patent
Lebby et al.

(10) Patent No.: US 6,999,644 B1
(45) Date of Patent: Feb. 14, 2006

(54) DISCRETE OPTOELECTRIC PACKAGE

(76) Inventors: Michael S. Lebby, 30 N. La Barge Rd., Apache Junction, AZ (US) 85219; Robert William Musk, 2 Overlanes, Kingston, Kingsbridge Devon TQ7 4PF (GB); Joseph John Vandenberg, 415 N. Lark Ellen Ave., West Covina, CA (US) 91791

( * ) Notice: Subject to any disclaimer, the term of this patent is extended or adjusted under 35 U.S.C. 154(b) by 356 days.

(21) Appl. No.: 10/367,173

(22) Filed: Feb. 14, 2003

Related U.S. Application Data

(60) Provisional application No. 60/357,514, filed on Feb. 15, 2002.

(51) Int. Cl.
*G02B 6/12* (2006.01)

(52) U.S. Cl. ........................... 385/14; 385/88; 385/92; 385/93; 385/94

(58) Field of Classification Search .................. 385/14, 385/31, 49, 88–93
See application file for complete search history.

(56) References Cited

U.S. PATENT DOCUMENTS

| | | | | |
|---|---|---|---|---|
| 5,257,336 A * | 10/1993 | Dautartas | ..................... | 385/93 |
| 6,095,698 A * | 8/2000 | Strab et al. | ..................... | 385/88 |
| 6,257,771 B1 * | 7/2001 | Okayasu | ..................... | 385/89 |

* cited by examiner

*Primary Examiner*—Jennifer Doan
(74) *Attorney, Agent, or Firm*—Parsons & Goltry; Robert A. Parsons; Michael W. Goltry

(57) ABSTRACT

An electro-optic package comprising an optoelectric module with a receptacle assembly, an optoelectric assembly fixedly attached to the receptacle assembly, the optoelectric assembly being in communication with the optoelectric module, wherein the optoelectric assembly includes optoelectronic circuitry and the optoelectronic circuitry includes at least one electrical connection for communication with external electronic circuitry, and wherein the electro-optic package forms a discrete package.

16 Claims, 12 Drawing Sheets

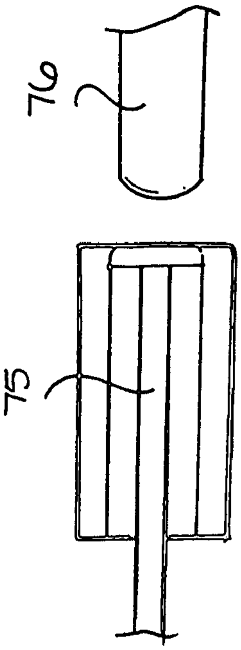
FIG. 17
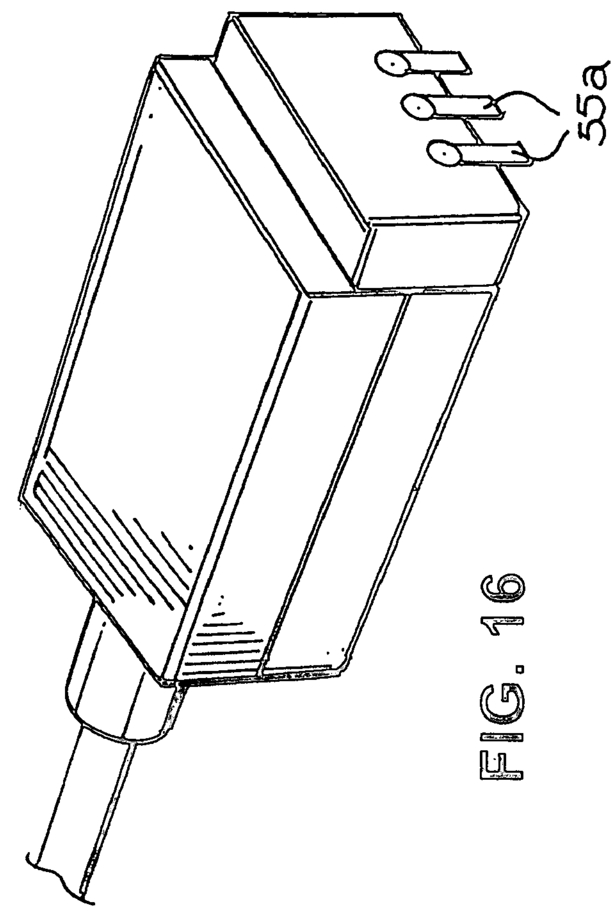
FIG. 16
FIG. 13
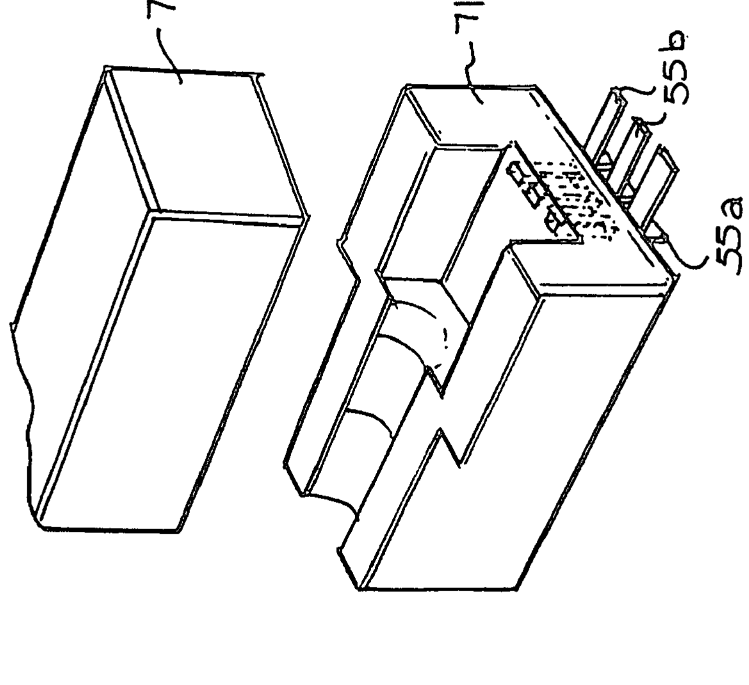

FIG. 14
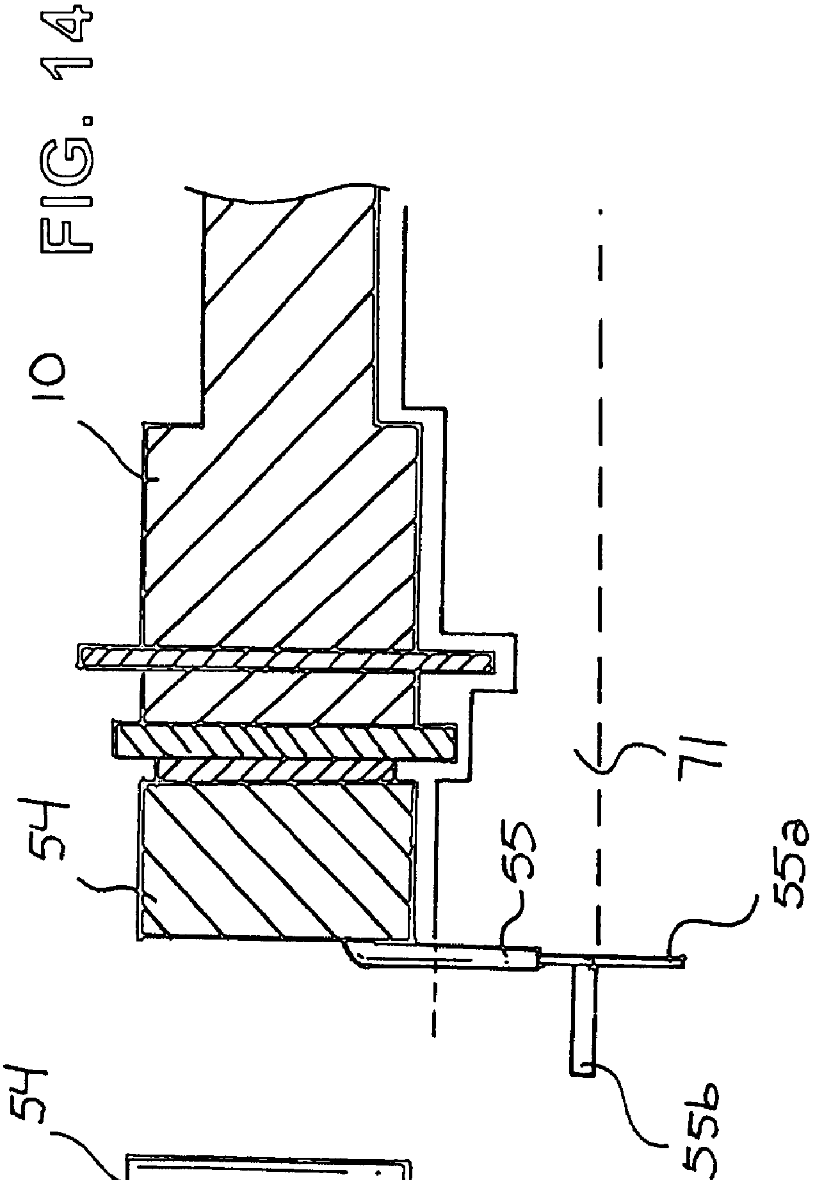
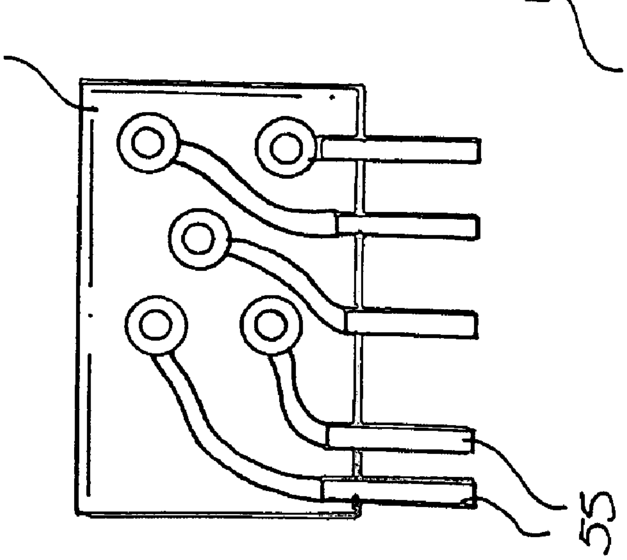
FIG. 15

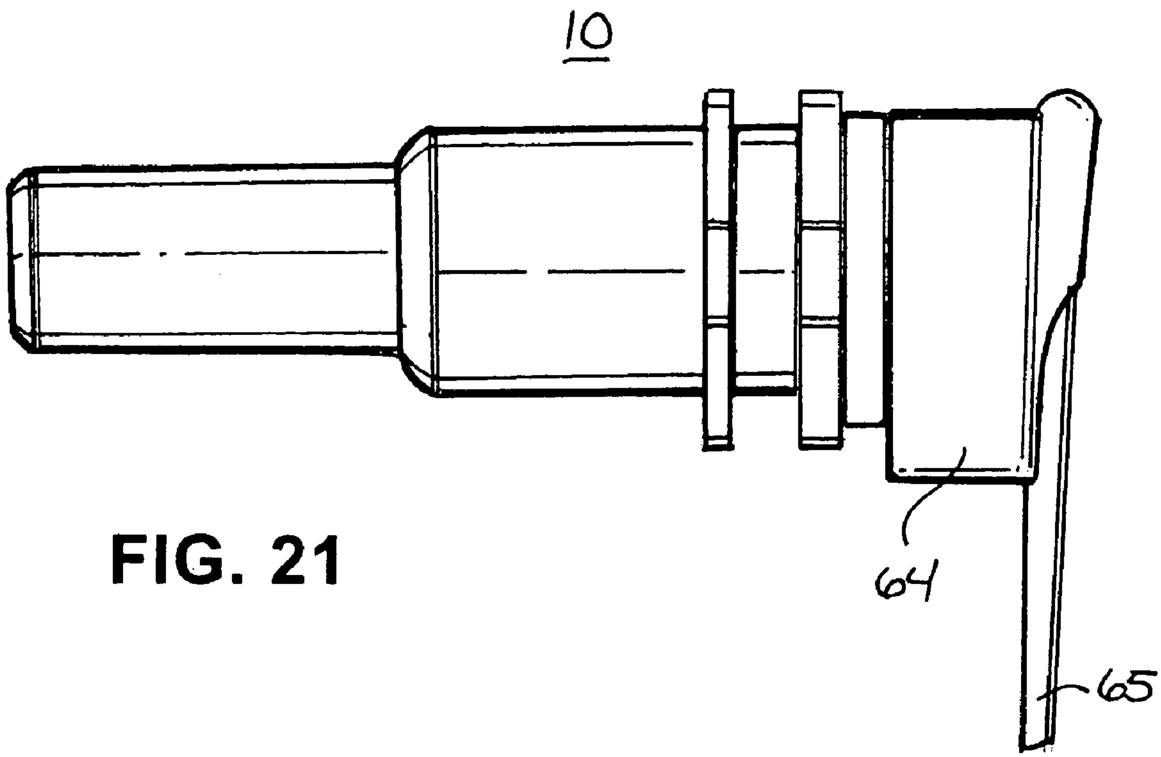
FIG. 21
FIG. 22
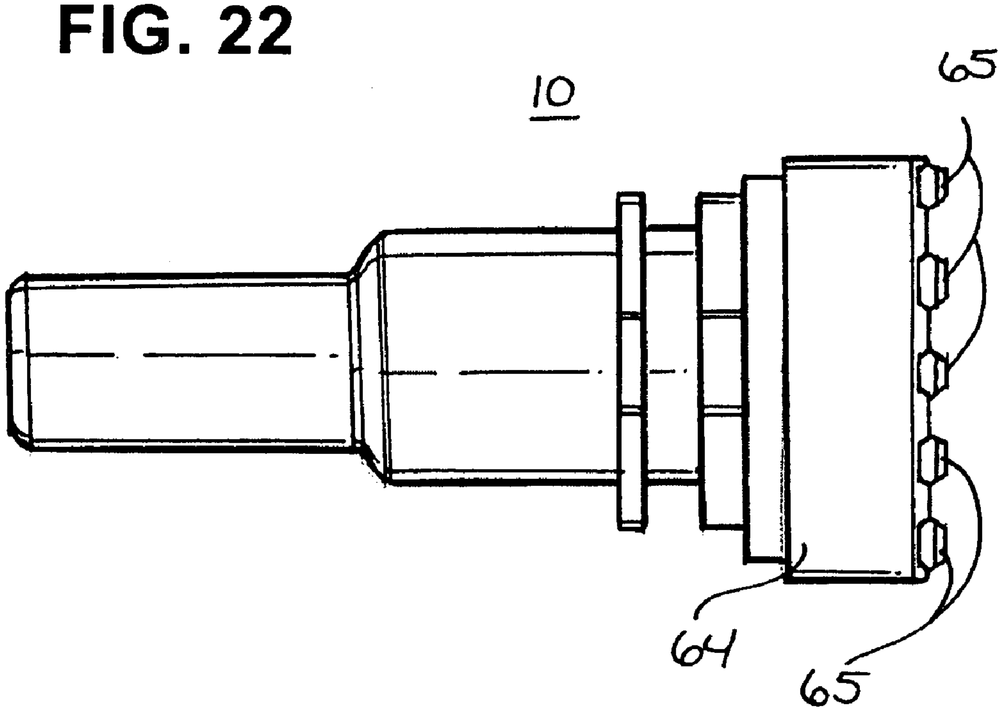

FIG. 24
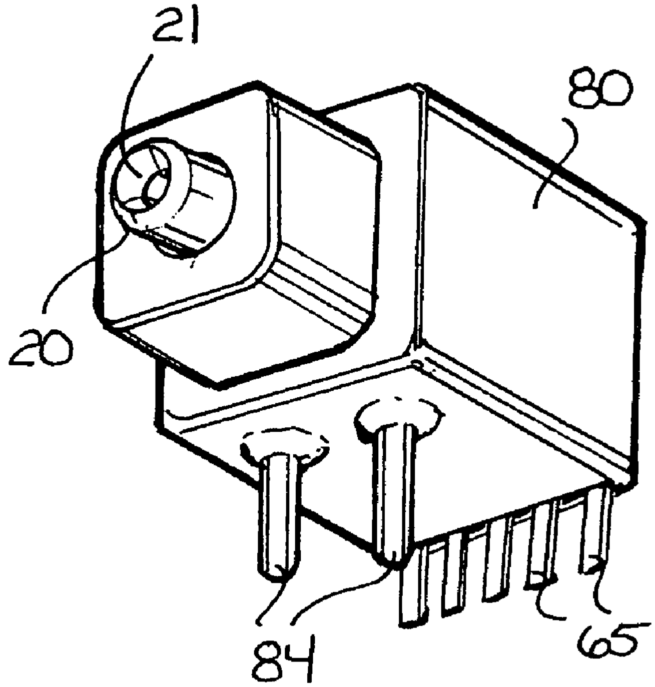
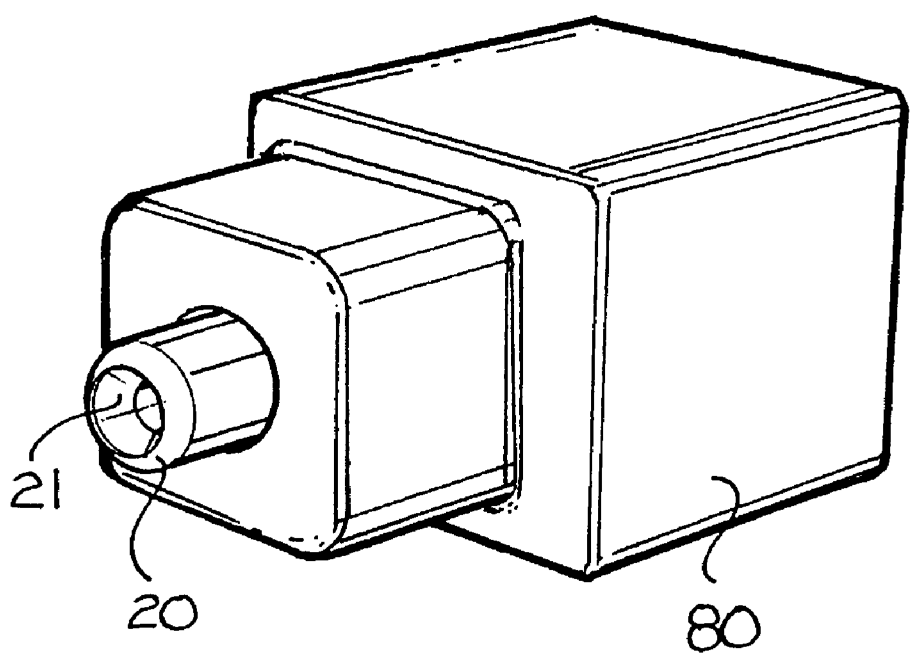
FIG. 25

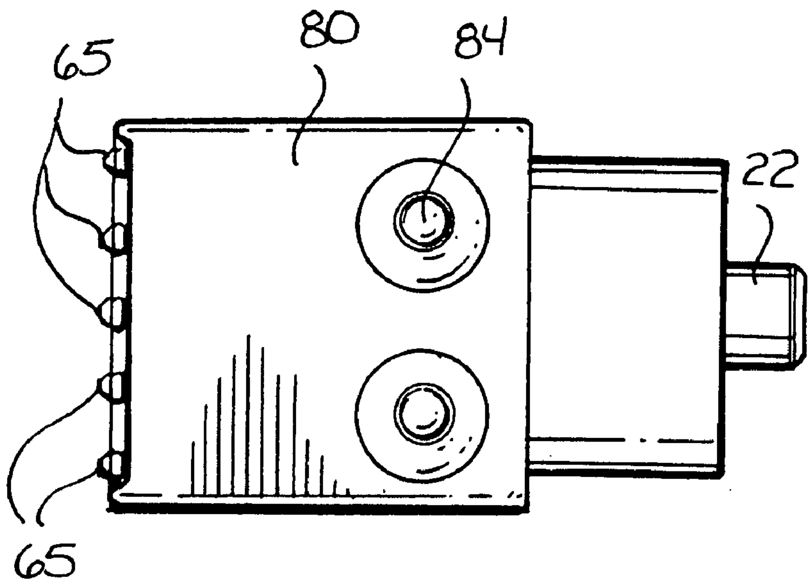
FIG. 26
FIG. 27
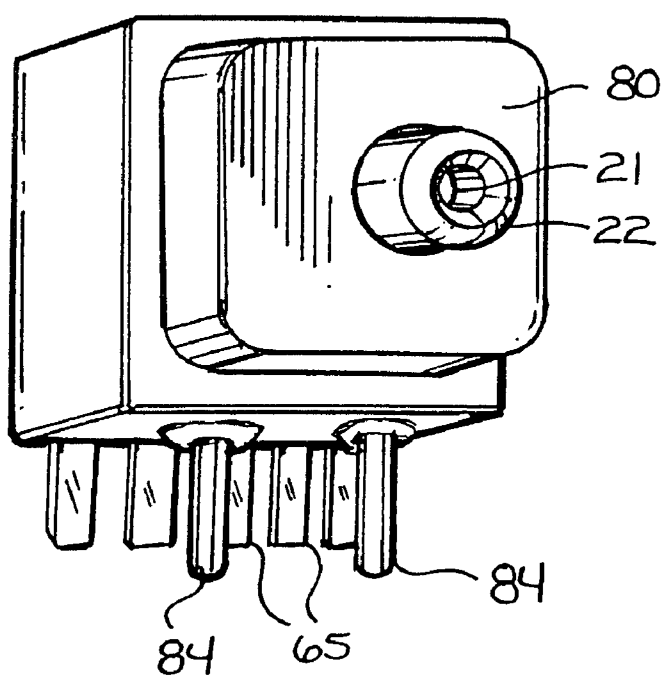

DISCRETE OPTOELECTRIC PACKAGE

CROSS-REFERENCED TO RELATED APPLICATION

This application claims the benefit of U.S. Provisional Application No. 60/357,514, filed 15 Feb. 2002.

FIELD OF THE INVENTION

This invention relates to optical-to-electrical and electrical-to-optical packages and, more particularly, to discrete optical-to-electrical or electrical-to-optical packages.

BACKGROUND OF THE INVENTION

Most optical-to-electrical and electrical-to-optical modules used in the various communications fields, are incorporated into packages containing one or more pairs of optical-to-electrical and electrical-to-optical modules. The modules are generally used in pairs for two-way communication and multiple pairs may be incorporated in a single package to provide multiple communication channels. Generally, one of the major problems in this industry is the transmission of light from the optical fiber to a light receiving device or the transmission of light from a light generating device to the optical fiber without being affected by assembly tolerances, temperature changes, component changes, and the like. It should be understood by those skilled in the art that the term "light" is a generic term that includes any electromagnetic radiation that can be modulated and transmitted by optical fibers or other optical transmission lines.

Here it will be understood that the optoelectric modules are used to communicate between an optical fiber and an optoelectric device, such as a light source (e.g. a laser, light emitting diode, etc.) generally referred to as a transmission module, or between an optical fiber and a light receiving device (e.g. a photodiode, PIN diode, PN diode, etc.) generally referred to as a receiving module. In this disclosure both transmission and receiving modules or packages are referred to generically as optoelectric modules or packages and the term "optoelectric" is intended to encompass both optical-to-electrical and electrical-to-optical.

Generally, one of the problems with optoelectric packages is the amount of time and effort required in the fabrication and assembly. Another problem that arises is that much of the time and effort in assembly and mounting is applied in alignment of the various components so that light generated by, for example a laser, reaches the core of an optical fiber and light emanating from an optical fiber must be directed onto a photodiode or the like. To overcome many of these problems, the industry has generally provided multiple communication channels in a single package. However, there are many applications in which discrete components or packages are useful and/or desirable.

BRIEF DESCRIPTION OF THE DRAWINGS

Referring to the drawings:

FIGS. 13, 14, 15, 16 and 17 illustrate various views in an embodiment of a clam-shell type of optoelectric package in accordance with the present invention;

FIGS. 21, 22 and 23 illustrate an optoelectric module for use with the housing of FIG. 18;

FIGS. 24, 25, 26 and 27 illustrate an optoelectric package including the housing of FIG. 18 and the optoelectric module of FIG. 21;

DETAILED DESCRIPTION OF THE PREFERRED EMBODIMENT

Figure 2:
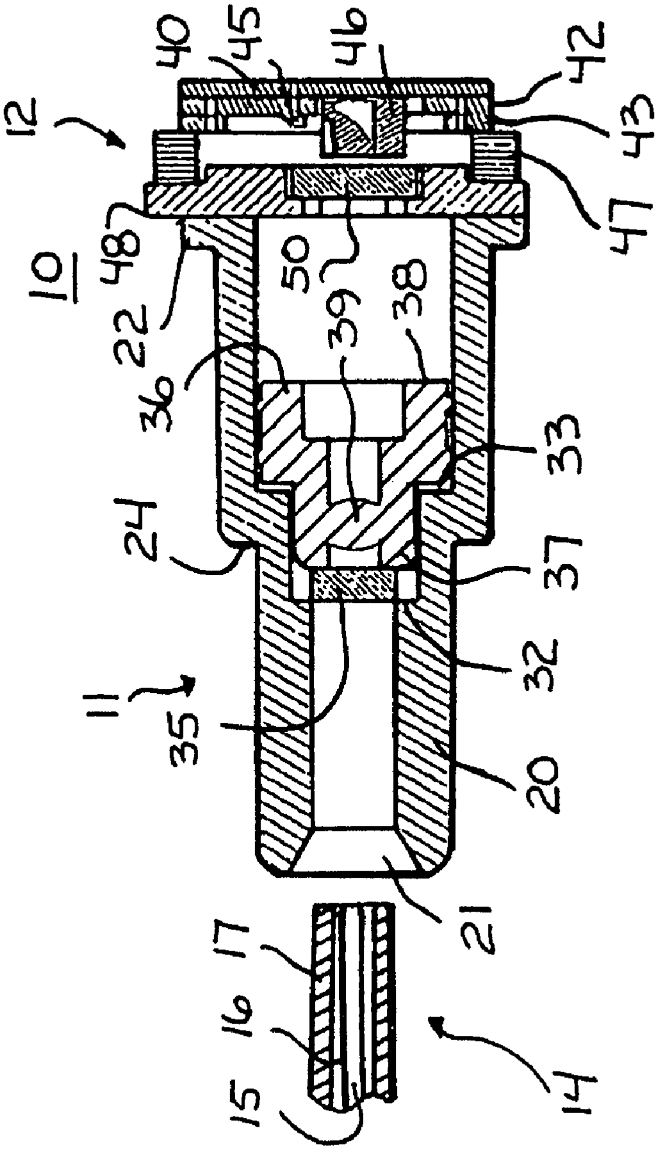
FIG. 2 is a sectional view as seen from the line 2—2 of FIG. 1.
Figure 1:
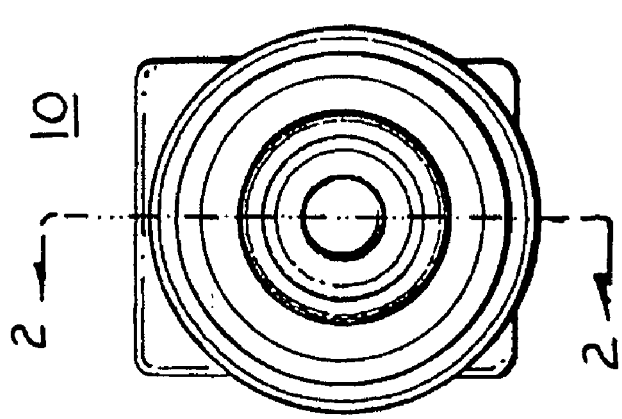
FIG. 1 is an end view of an embodiment of an optoelectric module.

Referring to FIGS. 1 and 2, an end view and a sectional view are illustrated of one embodiment of an optoelectric module 10 for use in accordance with the present invention. It will be understood by those skilled in the art that modules of the type discussed herein generally include a pair of channels, one of which receives electrical signals, converts the electrical signals to optical (light) beams by way of a laser or the like and introduces them into one end of an optical fiber, which then transmits the modulated optical beams to external apparatus. The second channel of the module receives modulated optical beams from an optical fiber connected to the external apparatus, conveys the modulated optical beams to a photodiode or the like, which converts them to electrical signals. In the following description, the apparatus and methods can generally be used in either of the channels but, since the optical portions of the two channels are substantially similar and since a major purpose of this invention is to provide discrete packages, only one channel will be discussed with the understanding that the description applies equally to both channels.

Module 10 of FIG. 1 includes a receptacle assembly 11 and an optoelectric assembly 12 aligned and affixed together, as will be disclosed in more detail below. Receptacle assembly 11 is designed to receive an optical fiber 14 in communication therewith, in a manner that will become clear presently. Optical fiber 14 includes a glass core 15, a cladding layer 16, and a ceramic ferrule 17. Receptacle assembly 11 includes an elongated cylindrical receptacle 20 defining a fiber receiving opening 21 at one end and a mounting flange 22 at the opposite end.

Receptacle 20 has a radially outward directed step 24 formed in the outer periphery to operate as a stop in the mounting process. Progressing from the end defining opening 21 toward the end defining flange 22, receptacle 20 has two radially outwardly directed steps 32 and 33. Step 32 provides a surface or stop for the mounting of an optical spacer 35 and step 33 provides a surface or a stop for the positioning of an optical lens assembly 36. In some embodiments desiring a high degree of moisture integrity, spacer 35 may be formed of glass and sealed tightly against step 32 by some convenient means, such as epoxy or the like. In this embodiment, lens assembly 36 is formed of plastic and may be, for example, molded to simplify manufacturing of module 10. It should be understood that the term "plastic" is used herein as a generic term to describe any non-glass optical material that operates to transmit optical beams of interest therethrough and which can be conveniently formed into lenses and the like. For example, in most optical modules used at the present time the optical beams are generated by a laser that operates in the infrared band and any materials that transmit this light, including some oxides and nitrides, come within this definition.

Lens assembly 36 defines a central opening for the transmission of light therethrough from an end 37 to an opposite end 38. A lens 39 is integrally formed in the central opening a fixed distance from end 37. Lens assembly 36 is formed with radially outwardly projecting ribs or protrusions in the outer periphery so that it can be press-fit into receptacle 20 tightly against spacer 35. Thus, lens assembly 36 is frictionally held in place within receptacle 20 and, in this embodiment, holds spacer 35 fixedly in place. Also, lens 39 is spaced a known distance from spacer 35. In this preferred embodiment, optical fiber 14 is inserted into receptacle 20 so that glass core 15 buts against spacer 35, which substantially reduces or suppresses return reflections. Further, by forming spacer 35 of glass material with an index of refraction similar to the index of refraction of glass core 15, spreading of the light beam is substantially reduced and lower optical power is required to collimate the beam.

Optoelectric assembly 12, in this preferred embodiment, utilizes a custom multilayer ceramic package including High Temperature Co-fired Ceramic (HTCC) or Low Temperature Co-fired Ceramic (LTCC) technology to provide mounting surfaces and electrical interconnects. For purposes of explanation only, assembly 12 is illustrated with a base ceramic layer 40 and a ceramic layer 42 positioned thereon. One or more spacer rings 43 may be positioned on ceramic layer 42 to provide sufficient distance for components mounted thereon, if required. In this example a laser 45 is mounted on the upper surface of ceramic layer 42 and positioned to transmit light generated therein to a lens block 46. Alternatively, laser 45 could be a photodiode or the like. In this example, lens block 46 is mounted on ceramic layer 42 by some convenient attachment method, such as using extending ears (not shown). A Kovar ring 47 is attached on spacer rings 43, preferably by brazing, and a flat or stepped lid 48 is affixed to Kovar ring 47 by some convenient means, such as welding. A primary purpose of these procedures is to enclose laser 45 (or the photodiode) in a hermetically sealed chamber. However, a hermetic seal is not necessary in many embodiments in which the laser or photodiode used is either separately sealed or is not sensitive to atmospheric conditions. Connections to the electrical components can be, for example, by coupling through base ceramic layer 40.

A window 50 is sealed in lid 48 so as to be aligned with lens block 46. Lens block 46 redirects light from laser 45 at a ninety degree angle out through window 50 and may include one or more lenses or optical surfaces (not illustrated). Further, as illustrated in FIG. 2, window 50 is affixed to the underside of lid 48 by some convenient means, such as solder glass, solder, epoxy or some appropriate adhesive, so as to hermetically seal the light transmitting opening through lid 48. If a hermetic seal is not required, window 50 and any lenses incorporated therein can be formed (e.g. molded) from plastic. Lens block 46 may be molded from plastic for convenience in manufacturing.

Optoelectric package 12 is affixed to receptacle assembly 11 with flange 22 of receptacle 20 butting against the upper surface of lid 48. Further, optoelectric package 12 is optically aligned with receptacle assembly 11 so that light from laser 45 is directed into core 15 of optical fiber 14 or light from core 15 of optical fiber 14 is directed onto an active surface of a photodiode. When alignment has been achieved, receptacle assembly 11 is fixed to optoelectric package 12 by some convenient means, such as welding or adhesive. A module similar to the one described above is illustrated in FIGS. 21, 22, and 23.

Figure 4:
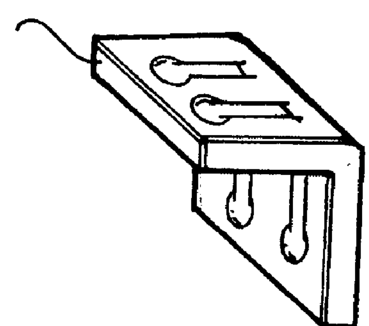
Figure 3:
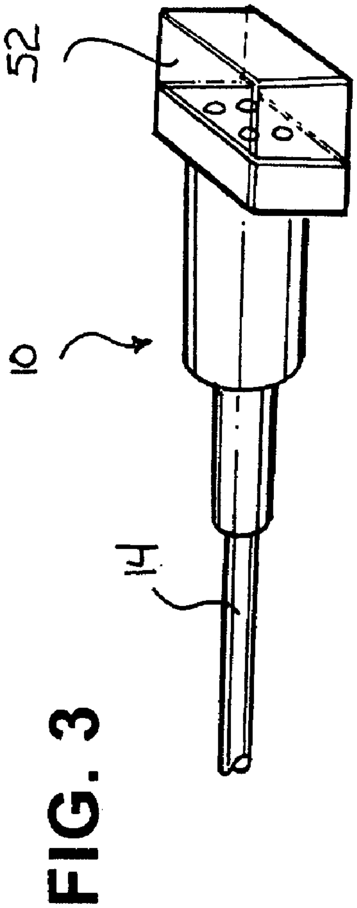

Turning now to FIG. 3, module 10, generally as described above, is illustrated as an optoelectric package by fixedly attaching an electrical board 52 including some electrical devices such as amplifiers, drivers, and the like, and/or electrical connections for external circuitry. Board 52 can be a printed circuit board, a ceramic board, a laminated ceramic board, etc. Referring additionally to FIG. 4, a connection board 53 is illustrated that can be used in conjunction with or instead of electrical board 52. Connection board 53 is preferably constructed of some rigid material, such as a hard plastic or ceramic, and provides external electrical connection terminals either on the back side of the upright portion or on the lower side of the horizontal portion (or both).

Figure 5:
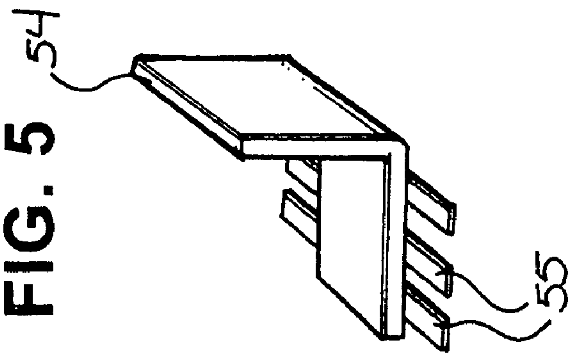
FIGS. 3, 4, 5, 6, 7, 8 and 9 illustrate various views of components in another embodiment of an optoelectric module or package in accordance with the present invention.
Figure 6:
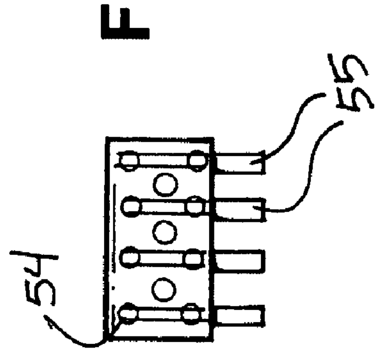

Referring additionally to FIG. 5, a connection board 54, similar to that illustrated in FIG. 4, is shown, with leads 55 extending outwardly from the horizontal portion (or alternately from the upright portion), rather than the terminals of board 53 in FIG. 4. A bottom view of connection board 54 is illustrated in FIG. 6. It will be understood that either board 53 or board 54 can be constructed in the L-shape illustrated or in a single surface, depending upon the specific application. In the case of the L-shaped board, a piece of flex lead may be used to connect terminals and or components on the two orthogonal surfaces.

Figure 7:
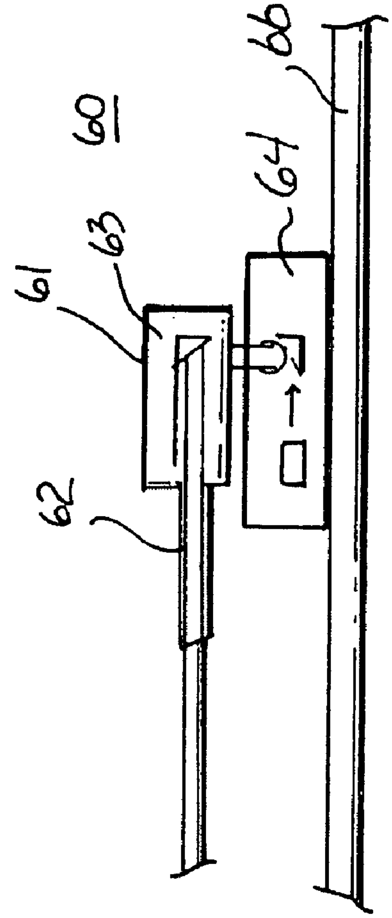
Figure 9:
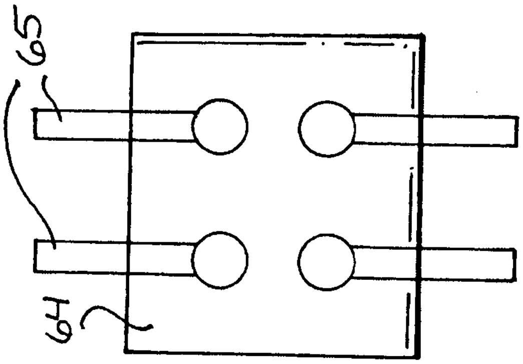
Figure 8:
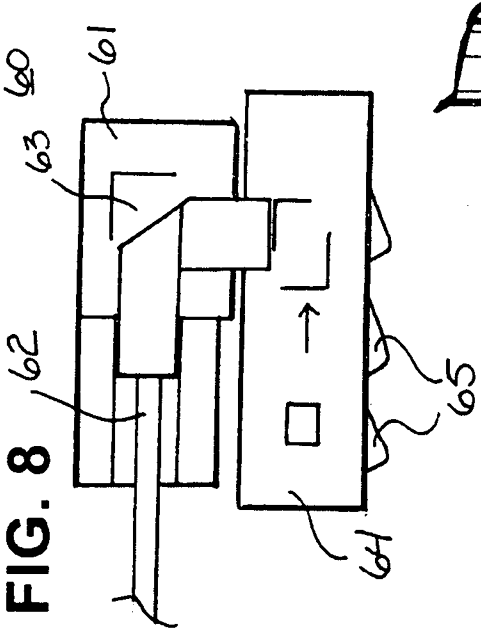

Turning now to FIGS. 7, 8, and 9, a package 60 is illustrated showing another embodiment. In this embodiment, an optical assembly 61 is affixed to the end of a ferrule 62 and includes a prism 63 for redirecting light at a ninety degree angle. Generally optics (e.g. similar to that described in conjunction with module 10) are included in optical assembly 61 so that collimated light is sent to or received from an optoelectric assembly 64. Optoelectric assembly 64 includes any optoelectric devices (e.g. photodiodes, lasers, etc.), drivers, modulators, amplifiers, etc. as well as leads or terminals for connecting package 60 to an external component. Thus, in this embodiment, the module is optically coupled to an optoelectric assembly, rather than being electrically coupled.

Figure 11:
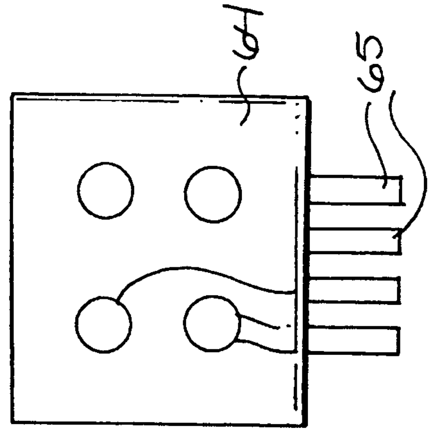
FIGS. 10, 11 and 12 illustrate various views in another embodiment of an optoelectric module or package.
Figure 12:
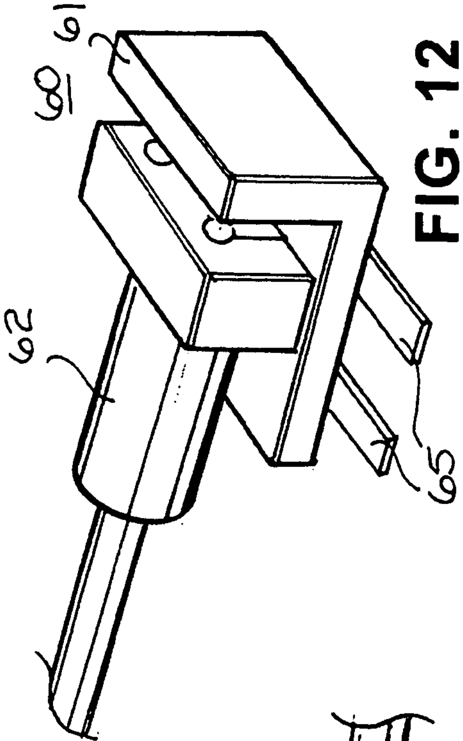
Figure 10:
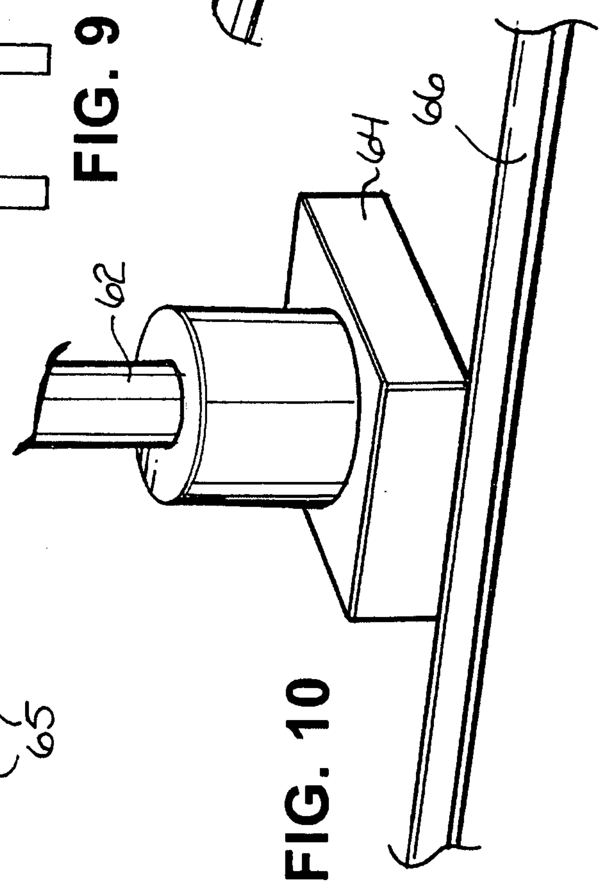

As illustrated best in FIGS. 8 and 9, an outer surface of optoelectric assembly 64 can include terminals or leads 65, as illustrated in FIG. 11 or 12, for electrically attaching package 60 to an external component or board 66 (see FIG. 7). In a slightly different embodiment, illustrated in FIG. 10, ferrule 62 supplies light directly to optoelectric assembly 64, without changing direction. In each of these embodiments, the ferrule and various boards can be encapsulated, or otherwise sealed together, to form a discrete package which generally may be mounted by soldering the leads or terminals to external equipment.

Turning now to FIG. 13, a clam shell type of housing 70 for enclosing and mounting a discrete optoelectric module is illustrated in an exploded perspective view. Housing 70 includes a lower portion 71 and a mating upper portion 72 constructed to encircle an optoelectric module, such as module 10, described above. In this embodiment, module 10 has a connection board 54, with leads 55 (or a connection board 64 with leads 65) extending therefrom, attached to the end as can be best seen in FIG. 15. It will be understood that leads 55 may extend downwardly through lower portion 71 of housing 70 (see leads 55*a* in FIGS. 13 and 14) for electrical connection to external equipment and/or they may extend rearwardly (see leads 55*b* in FIGS. 13 and 14), depending upon the external equipment and the specific application.

Upper portion 72 is matingly engaged over module 10 and lower portion 71 and the two portions are sealed together by any convenient means, such as adhesive, soldering, etc. to provide the complete package illustrated in FIG. 16. In one embodiment, the inner surfaces of portions 71 and 72 of clam shell housing 70 include a metal (or conductive) lining to provide electromagnetic interference (hereinafter referred to as "EMI") protection for the finished package. The package can be surface mounted using, for example, leads 55*a* for electrical and physical connection. In a different embodiment, illustrated schematically in FIG. 17, the module can include two separate components 75 and 76 that communicate optically, rather than electrically. Components 75 and 76 can then be placed in clam shell housing 70, which may be constructed to align components 75 and 76 optically.

Figure 18:
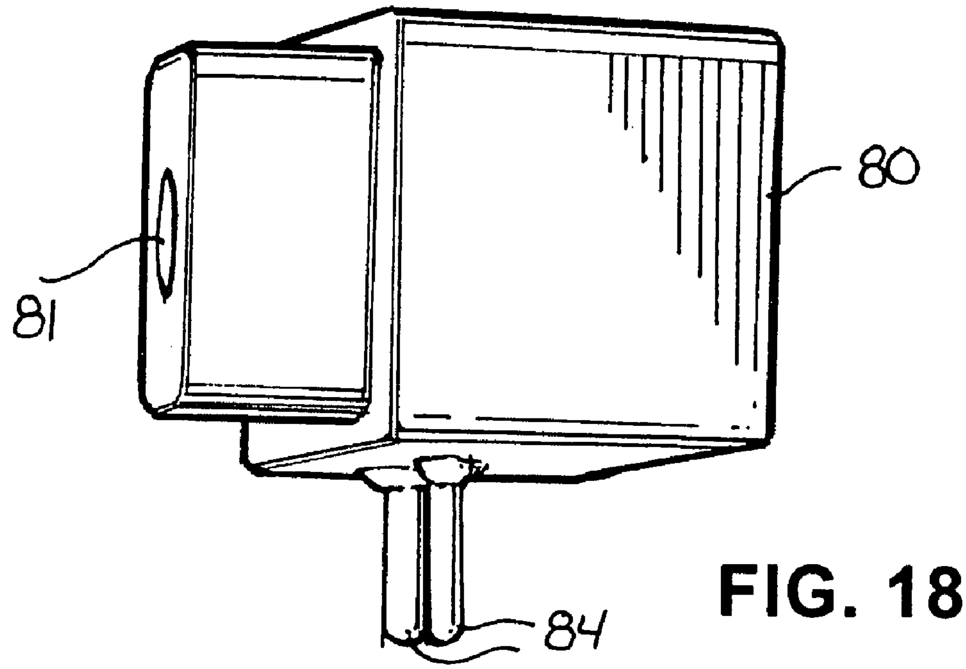
FIGS. 18, 19 and 20 illustrate various views of a housing for mounting an optoelectric module.
Figure 19:
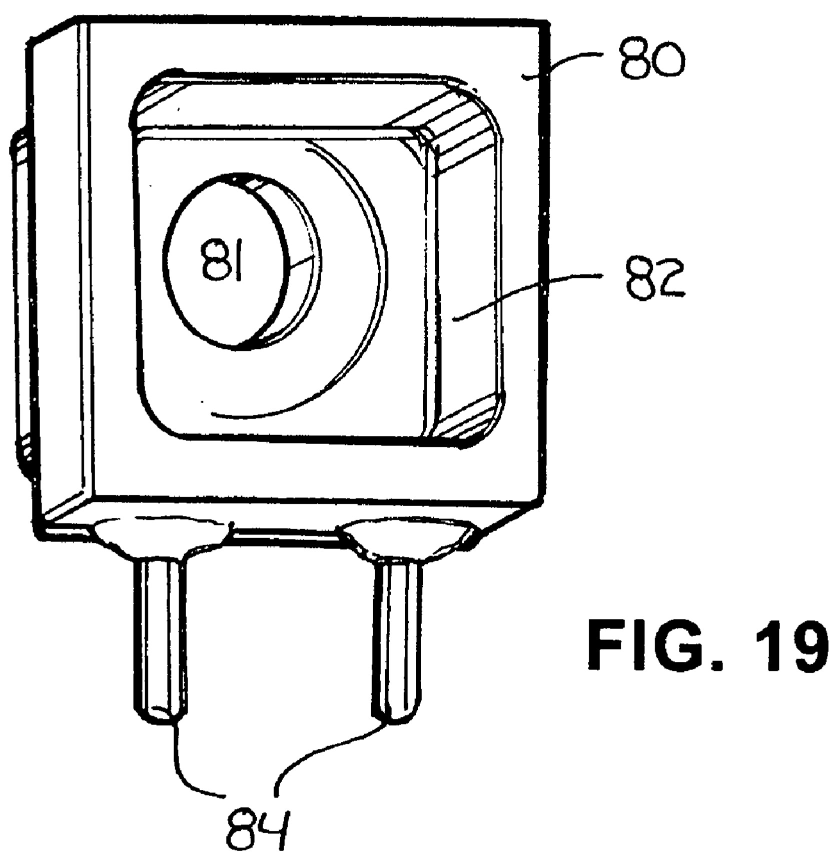
Figure 20:
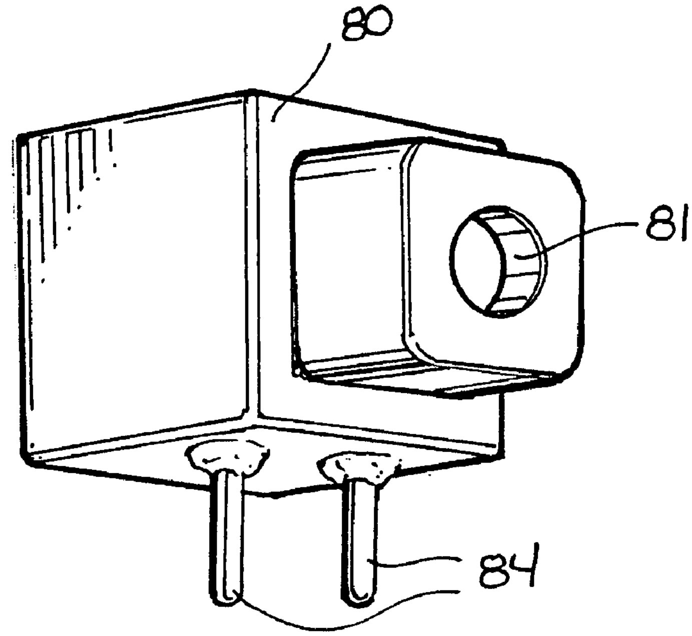

Turning now to FIGS. 18, 19, and 20, another housing 80 is illustrated for enclosing and mounting a discrete optoelectric module. Housing 80 has a substantially rectangular cross-section with a small opening 81 at one end and a larger opening or substantially hollow interior 82 accessible at the other end. A pair of mounting pins 84 extend from the lower surface for surface mounting the complete package. It will of course be understood that other shapes, both interior and exterior, may be devised for specific applications, and other or additional mounting pins or other mounting devices may be devised for specific mounting situations.

Figure 23:
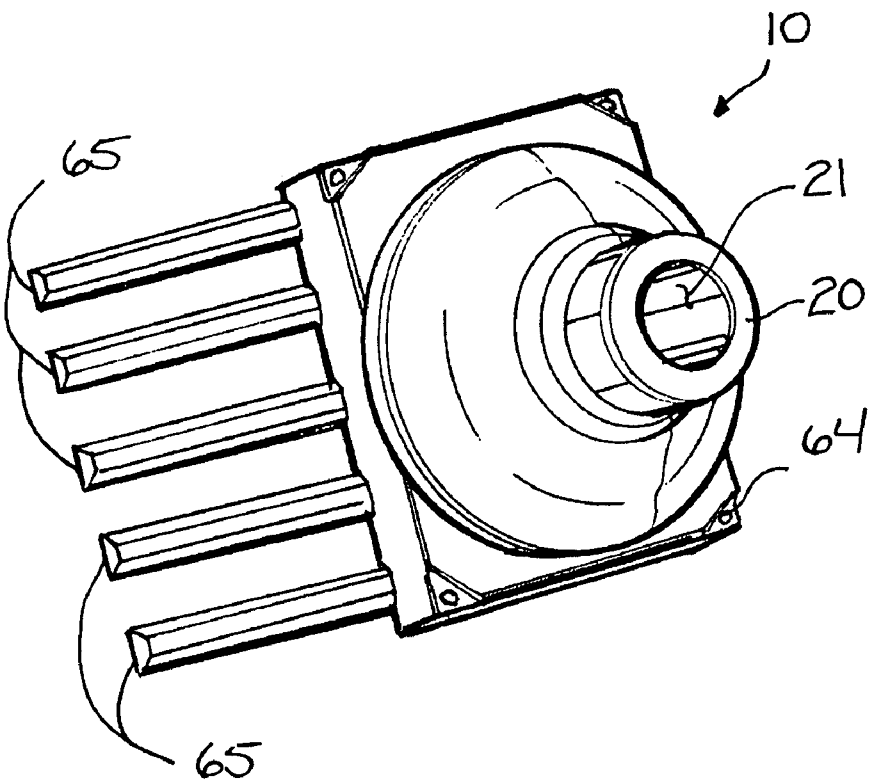

Turning to FIGS. 21, 22, and 23, an optoelectric module 10, with a multilayer hermetic ceramic package including a connection board (e.g., connection board 64) having outwardly extending leads 65 attached thereto, is provided. Module 10 may be, for example, similar to the optoelectric module described and illustrated in FIGS. 1 and 2. Optical fiber receiving opening 21 in receptacle 20 can best be seen in FIG. 23.

Referring additionally to FIGS. 24, 25, 26, and 27, module 10 of FIG. 21 is placed in housing 80 of FIG. 20 so that the end of receptacle 20 extends slightly through opening 81. Also, as can best be seen in FIG. 24 or 26, connection board 64 is positioned to seal opening 82 in housing 80. Alternatively, connection board 64 is sealed in opening 82 by some convenient means, such as epoxy or the like. In a preferred embodiment, module 10 is press fitted directly into housing 80. In some embodiments housing 80 may be lined with metal or completely formed of metal to provide EMI shielding.

Figure 28:
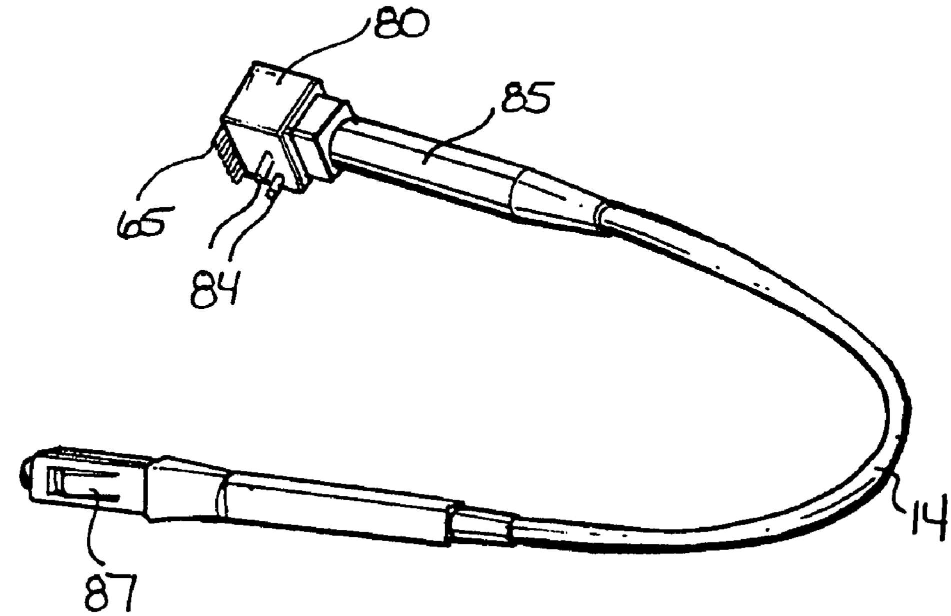
FIGS. 28 and 29 are two isometric views of the optoelectric package of FIG. 24 pigtailed with an optical fiber.
Figure 29:
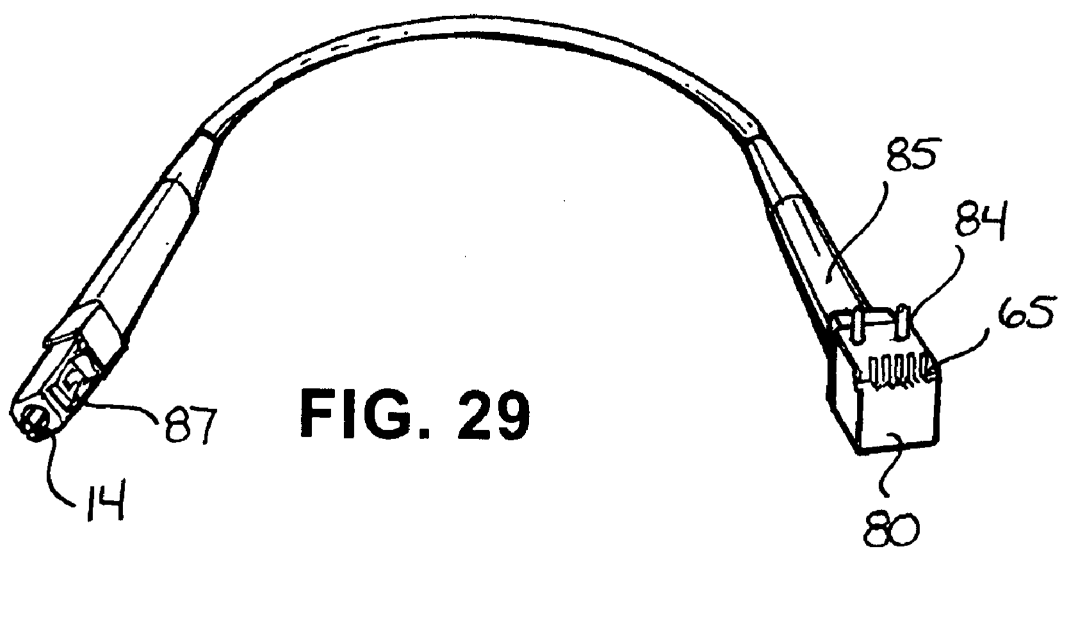

Referring additionally to FIGS. 28 and 29, the optoelectric package, including optoelectric module 10 enclosed in housing 80, is illustrated in a discrete pigtail arrangement. In this arrangement one end of an optical fiber 14 is engaged in opening 21 in receptacle 20. This may be a fixed connection or a plug-in type of connection with an outer element (ferrule 17 illustrated in FIG. 2) that is frictionally engaged in the end of receptacle 20. The opposite end of optical fiber 14 has a connection 87 which is designed to mate with external equipment or another length of optical fiber. Generally connection 87 is a standard off-the-shelf connection which will mate with any standard external equipment.

Figure 31:
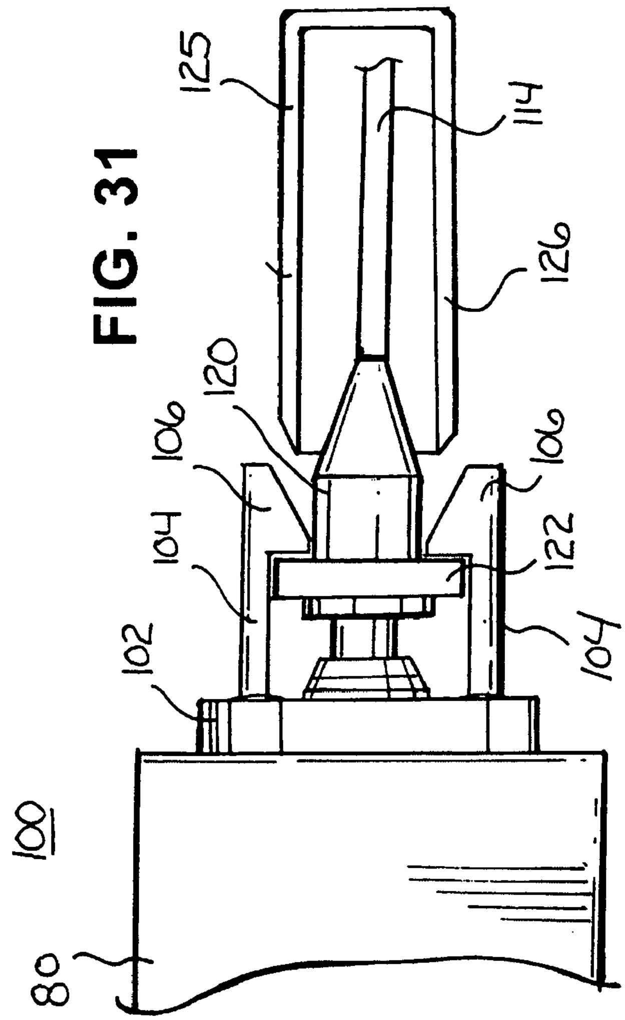
FIGS. 30 and 31 are isometric and partial side sectional views, respectively, of detachable optical fiber apparatus.
Figure 30:
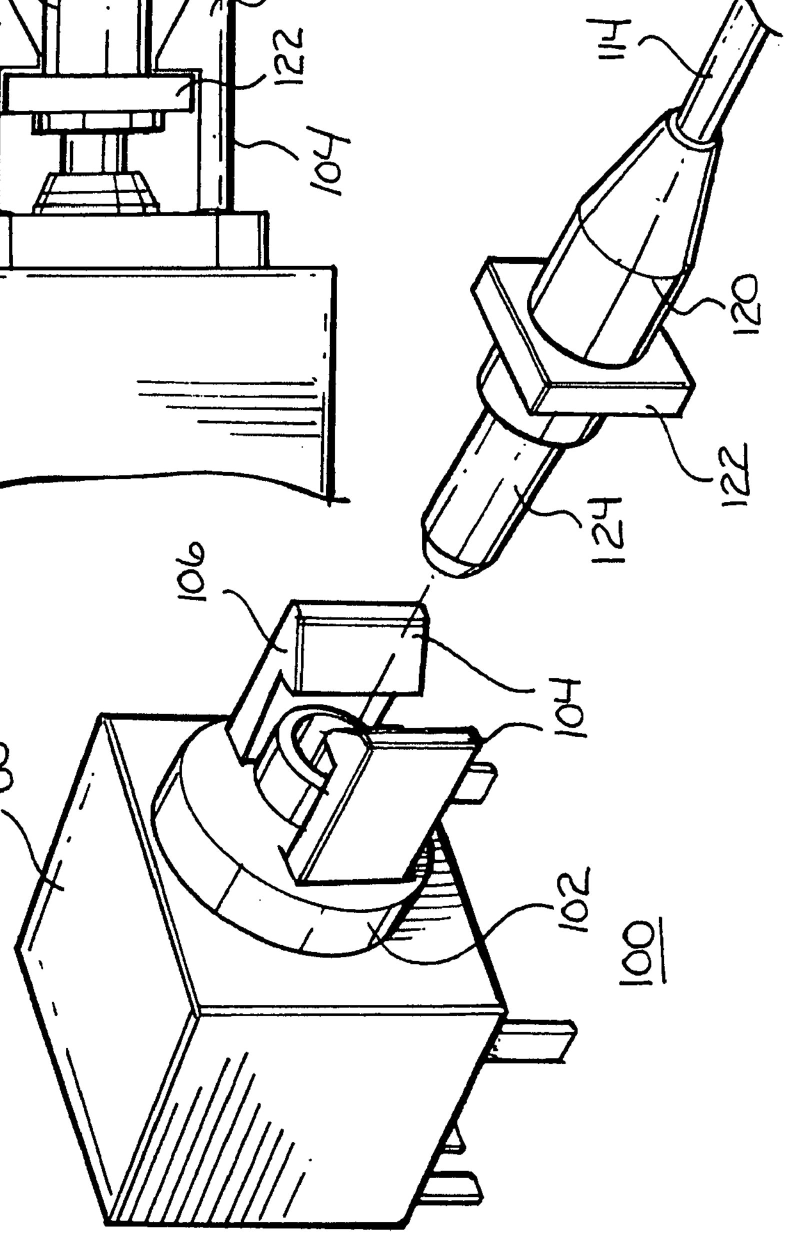

Turning to FIGS. 30 and 31, one embodiment of detachable optical fiber apparatus, generally designated 100, is illustrated. Apparatus 100 includes a collar 102 fixedly attached to the front surface of, for example, housing 80. Collar 102 is further constructed with a central opening to allow the end of receptacle 20 (see FIG. 2) to protrude therethrough. An opposed pair of flexible fingers 104 are mounted to, or formed as an integral part of, collar 102 so as to extend forwardly on each side of receptacle 20. Each flexible finger 104 has an inwardly projecting catch 106. Each catch 106 is formed with a forward cam surface and a rearward perpendicular catch surface.

A mating optical fiber 114, is provided with a plastic housing 120 defining outwardly projecting shoulders 122. A spring ferrule 124 is affixed to housing 120 so as to initially engage receptacle 20 for guidance and to recede into housing 120 as housing 120 is moved into engagement with fingers 104. As housing 120 is moved into engagement with fingers 104, shoulders 122 initially engage the cam surfaces of catches 106 and force fingers 104 apart. Upon further movement, the fingers 104 close behind shoulders 122 with the catch surfaces of catches 106 fixedly engaged behind shoulders 122, in this position ferrule 124 and optical fiber 114 are optically connected to receptacle 20.

Housing 120 can be quickly and easily disengaged from fingers 104 and housing 80 by using a hand tool, such as tool 125, illustrated in FIG. 31. Tool 125 includes a pair of spaced apart stiff fingers 126 designed to be positioned on opposite sides of housing 120. The protruding ends of fingers 126 are slanted outwardly and rearwardly so as to engage the cam surfaces of catches 106 of fingers 104 and spread fingers 104 outwardly to release shoulders 122 from the catch surfaces. Housing 120 can then be easily pulled away from engagement with fingers 104 and housing 80.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An electro-optic package comprising:

an optoelectric module with an optical coupling efficiency, the optoelectric module comprising a receptacle assembly with an end and an opposed end;

wherein the end of the receptacle assembly is capable of receiving a light guiding element;

wherein the opposed end of the receptacle assembly is capable of receiving an optical lens assembly positioned therein the receptacle assembly;

wherein an optoelectric package which includes an optoelectronic device is capable of being affixed to, the opposed end of the receptacle assembly;

wherein an optical axis extends from the end to the opposed end of the receptacle assembly such that the light guiding element and the optoelectric device are in communication through a lens included within the optical lens assembly; and wherein the optical lens assembly is held fixedly in place against an inward periphery of the receptacle assembly such that a distance between the lens and the optoelectronic device can be adjusted to adjust the optical coupling efficiency;

an optoelectric assembly fixedly attached to the receptacle assembly, the optoelectric assembly being in optoelectrical communication with the optoelectric module;

wherein the optoelectric assembly includes electronic circuitry; and wherein the electronic circuitry includes at least one electrical connection for electrical communication with external electronic circuitry.

2. A package as claimed in claim 1 wherein the optoelectric assembly includes at least one prism for optical communication with the electronic circuitry.

3. A package as claimed in claim 1 wherein a connection board is fixedly attached to the optoelectric assembly.

4. A package as claimed in claim 3 wherein the connection board includes at least one of a plastic, a ceramic, and a similar insulating material.

5. A package as claimed in claim 4 wherein the connection board includes at least one external electrical connection terminal.

6. A package as claimed in claim 5 wherein at least one of an electrical board and the connection board are L-shaped.

7. A package as claimed in claim 1 wherein at least one of the optoelectric module and the optoelectric assembly are encapsulated to form a discrete package.

8. A package as claimed in claim 7 wherein the encapsulation is provided by at least one of a clamshell housing and a rectangular housing.

9. A package as claimed in claim 7 wherein the clamshell housing includes an upper portion and a lower portion wherein the upper and lower portions are fixedly sealed together by using at least one of an adhesive, soldering, and press fitting.

10. A package as claimed in claim 7 wherein the encapsulation includes a conductive lining to provide electromagnetic interference protection to at least one of the optoelectic module and the optoelectric assembly.

11. An electro-optic package comprising:

an optoelectric module with an optical coupling efficiency, the optoelectric module comprising a housing with a side and an opposed side;

wherein the housing includes optoelectronic circuitry;

wherein the optoelectronic circuitry includes at least one electrical connection for electrical communication with external electronic circuitry;

wherein the side of the housing is capable of receiving a receptacle assembly with an end and an opposed end;

wherein the end of the receptacle assembly is fixedly held in place by a collar;

wherein the collar includes outwardly projecting flexible fingers wherein each outwardly projecting finger includes an inwardly projecting catch;

wherein the end of the receptacle assembly is capable of receiving a light guiding element;

wherein the opposed end of the receptacle assembly is capable of receiving an optical lens assembly positioned therein the receptacle assembly;

wherein an optoelectric package which includes an optoelectronic device is capable of being affixed to the opposed end of the receptacle assembly;

wherein an optical axis extends from the end to the opposed end of the receptacle assembly such that the light guiding element and the optoelectric device are in communication through a lens included within the optical lens assembly; and wherein the optical lens assembly is held fixedly in place against an inward periphery of the receptacle assembly such that a distance between the lens and the optoelectronic device can be adjusted to adjust the optical coupling efficiency; and an optoelectric assembly capable of being fixedly attached to the receptacle assembly using the outwardly projecting fingers, the optoelectric assembly being in optoelectrical communication with the optoelectric module through an optical fiber.

12. A package as claimed in claim 1 wherein the optoelectric assembly includes at least one prism for optical communication with the external electronic circuitry.

13. A package as claimed in claim 11 wherein the housing includes an upper portion and a lower portion wherein the upper and lower portions are fixedly sealed together by using at least one of an adhesive, soldering, and press fitting.

14. A package as claimed in claim 13 wherein the housing includes a conductive lining to provide electromagnetic interference protection to at least one of the optoelectic module and the optoelectric assembly.

15. A package as claimed in claim 11 wherein the housing includes a moldable plastic.

16. A package as claimed in claim 11 wherein the housing is surface mounted.

* * * * *